United States Patent
Chan et al.

(10) Patent No.: US 9,563,413 B2
(45) Date of Patent: Feb. 7, 2017

(54) CONFIGURABLE APPLICATION STATE SYNCHRONIZATION

(71) Applicant: NEXTBIT SYSTEMS INC., San Francisco, CA (US)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

( * ) Notice: Subject to any disclaimer, the term of this patent is extended or adjusted under 35 U.S.C. 154(b) by 188 days.

(21) Appl. No.: 14/221,706

(22) Filed: Mar. 21, 2014

(65) Prior Publication Data

US 2014/0289195 A1 Sep. 25, 2014

Related U.S. Application Data

(60) Provisional application No. 61/804,134, filed on Mar. 21, 2013.

(51) Int. Cl.

| | |
|---|---|
| *G06F 7/00* | (2006.01) |
| *G06F 17/00* | (2006.01) |
| *G06F 9/45* | (2006.01) |
| *G06F 9/54* | (2006.01) |
| *G06F 17/30* | (2006.01) |
| *H04L 29/08* | (2006.01) |

(Continued)

(52) U.S. Cl.
CPC . *G06F 8/44* (2013.01); *G06F 9/54* (2013.01); *G06F 11/1464* (2013.01); *G06F 17/3053* (2013.01); *G06F 17/30174* (2013.01); *G06F 17/30194* (2013.01); *G06F 17/30575* (2013.01); *H04L 41/0816* (2013.01); *H04L 47/70* (2013.01); *H04L 47/78* (2013.01); *H04L 63/0853* (2013.01); *H04L 67/10* (2013.01); *H04L 67/1095* (2013.01); *H04L 69/04* (2013.01); *H04W 12/06* (2013.01); *G06F 11/1451* (2013.01); *G06F 11/1469* (2013.01)

(58) Field of Classification Search
CPC .......... H04L 29/0854; G06F 17/30575; H04M 2203/554
USPC ......................................................... 707/620
See application file for complete search history.

(56) References Cited

U.S. PATENT DOCUMENTS

| | | | |
|---|---|---|---|
| 9,060,239 B1 * | 6/2015 | Sinha ...................... | H04L 51/04 |
| 2002/0118225 A1 * | 8/2002 | Miksovsky ............... | G06F 8/38 |
| | | | 715/762 |

(Continued)

*Primary Examiner* — Binh V Ho

(57) ABSTRACT

Technology is disclosed for providing configurable synchronization mechanisms for automatic synchronization of application states across multiple devices using cloud storage. In accordance with the techniques introduced here, a method includes steps of receiving a request for supplemental application synchronization information associated with a first application on a first remote computing device. In response the request for the supplemental application synchronization information, application-specific configuration information is determined for synchronizing a state of the first application to a cloud-based storage service. The supplemental application synchronization information including the application-specific configuration information is then provided to the first remote computing device for facilitating synchronization of the state of the first application to the cloud-based storage service.

22 Claims, 11 Drawing Sheets

(51) Int. Cl.
*G06F 11/14* (2006.01)
*H04L 12/24* (2006.01)
*H04L 12/911* (2013.01)
*H04L 29/06* (2006.01)
*H04W 12/06* (2009.01)

(56) References Cited

U.S. PATENT DOCUMENTS

| | | | | |
|---|---|---|---|---|
| 2003/0084306 A1* | 5/2003 | Abburi | G06F 21/10 | 713/188 |
| 2005/0073982 A1* | 4/2005 | Corneille | H04L 29/12066 | 370/338 |
| 2006/0041686 A1* | 2/2006 | Caspi | H04L 67/1095 | 709/248 |
| 2006/0206583 A1* | 9/2006 | Hill | G06F 9/466 | 709/218 |
| 2007/0043766 A1* | 2/2007 | Nicholas | H04L 67/02 | |
| 2008/0049714 A1* | 2/2008 | Commarford | G06Q 20/105 | 370/350 |
| 2008/0092239 A1* | 4/2008 | Sitrick | G06F 21/10 | 726/27 |
| 2009/0247134 A1* | 10/2009 | Jeide | H04L 67/2842 | 455/414.2 |
| 2010/0100590 A1* | 4/2010 | Palay | G06Q 10/107 | 709/203 |
| 2010/0180016 A1* | 7/2010 | Bugwadia | G06F 9/4411 | 709/220 |
| 2011/0208697 A1* | 8/2011 | Ramanujam | G06F 17/30575 | 707/626 |
| 2012/0079095 A1* | 3/2012 | Evans | G06F 8/61 | 709/224 |
| 2012/0131340 A1* | 5/2012 | Teuwen | H04L 9/3278 | 713/168 |
| 2012/0296870 A1* | 11/2012 | Fu | H04L 67/1095 | 707/625 |
| 2013/0151657 A1* | 6/2013 | Lehman | G06F 17/30575 | 709/217 |
| 2013/0268999 A1* | 10/2013 | Kiang | H04L 29/0854 | 726/4 |
| 2013/0298197 A1* | 11/2013 | Baliga | G06F 21/34 | 726/4 |
| 2014/0148246 A1* | 5/2014 | Quan | A63F 13/10 | 463/24 |

\* cited by examiner

CONFIGURABLE APPLICATION STATE SYNCHRONIZATION

PRIORITY CLAIM

This application claims the benefit of U.S. Provisional Patent Application No. 61/804,134, entitled "OPERATING SYSTEM AND DEVICE INTEGRATED WITH CLOUD COMPUTING FUNCTIONALITIES," filed on Mar. 21, 2013, which is incorporated by reference herein in its entirety.

FIELD OF THE INVENTION

At least one embodiment of the present invention pertains to cloud computing, and more particularly, to configurable synchronization mechanisms for automatic synchronization of application states across multiple devices using cloud storage.

BACKGROUND

Portable devices such as mobile phones, smartphones, and tablet computers have become more common among individuals. A large amount of data may be stored on these devices which may be needed to be backed up and/or synchronized to other devices. Cloud computing technology may permit a user to back up their data on a remote server and/or synchronize there data to other devices.

Application state data is data used to record the running status of a computer application. One example of application state data is a game save for a game application. A game save is a piece of digitally stored information about the progress of a user operating the game application. The game save can be reloaded later, so that the user can continue where she stopped. Typically, a user instructs the game application to generate a game save (i.e. save the game) to prevent the loss of progress in the game, especially when she is interrupted or ending a game session.

Sharing game saves among users has been common for many years. Sharing was originally achieved by swapping memory cards having the game saves stored thereon allowing the users to, for example, aid one another in unlocking particular features of a game application. With the growing popularity of the Internet, users started to upload their game saves to Internet. By downloading a game save from an Internet server, a user can continue the progress of the game on the device on which he played the game or another device such as a computer, game console, or smart phone.

However, to achieve the goal of continuing the progress on another different device, the user needs to deliberately instruct the device to save the game progress (i.e. game save) and to upload the game save to a server or a memory card. Then the user needs to download the game from the server or the memory card to the other device, and instruct the other device to load the game save. The whole process is tedious and requires considerable user intervention. Furthermore, the process only works for game applications that are specifically designed with game saving functionalities. In addition to game saves, other digital content on a device can also share among users.

Unfortunately, sometimes application developers encrypt data needed to be backed up or synched or the data needed to be backed up or synched may have certain constraints that cause the back up or synchronization to fail.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

Technology is disclosed for providing configurable synchronization mechanisms for automatic synchronization of application states across multiple devices using cloud storage. In accordance with the techniques introduced here, a method includes steps of receiving a request for supplemental application synchronization information associated with a first application on a first remote computing device. In response the request for the supplemental application synchronization information, application-specific configuration information is determined for synchronizing a state of the first application to a cloud-based storage service. The supplemental application synchronization information including the application-specific configuration information is then provided to the first remote computing device for facilitating synchronization of the state of the first application to the cloud-based storage service.

In some embodiments, certain application developers take state information (e.g., game save) and encrypt it in local memory (e.g., SD card) with a hard-wired device identifier as the encryption key. Consequently, while the state information can be synchronized with other devices, the other devices cannot properly access the synchronized information because the devices cannot decrypt the information using their device identifiers. The configurable synchronization mechanisms described herein spoof device identifiers facilitating the automatic synchronization of application states across multiple devices using cloud storage service even when the synchronized data has been encrypted with a hard-wired device identifier associated with another device.

In some embodiments, particular applications are associated with one or more application constraints. The application constraints can be, for example, DRM constraints that are placed on particular content items and/or the applications themselves. The described technology identifies these constraints and can interact and/or otherwise communicate the constraint information to user's. The users can then set particular configuration settings for the constraints and/or otherwise determine if they want to synchronize particular application content and/or particular data objects based on the constraint information.

Other aspects of the technology introduced here will be apparent from the accompanying figures and from the detailed description which follows.

Environment

Figure 1:
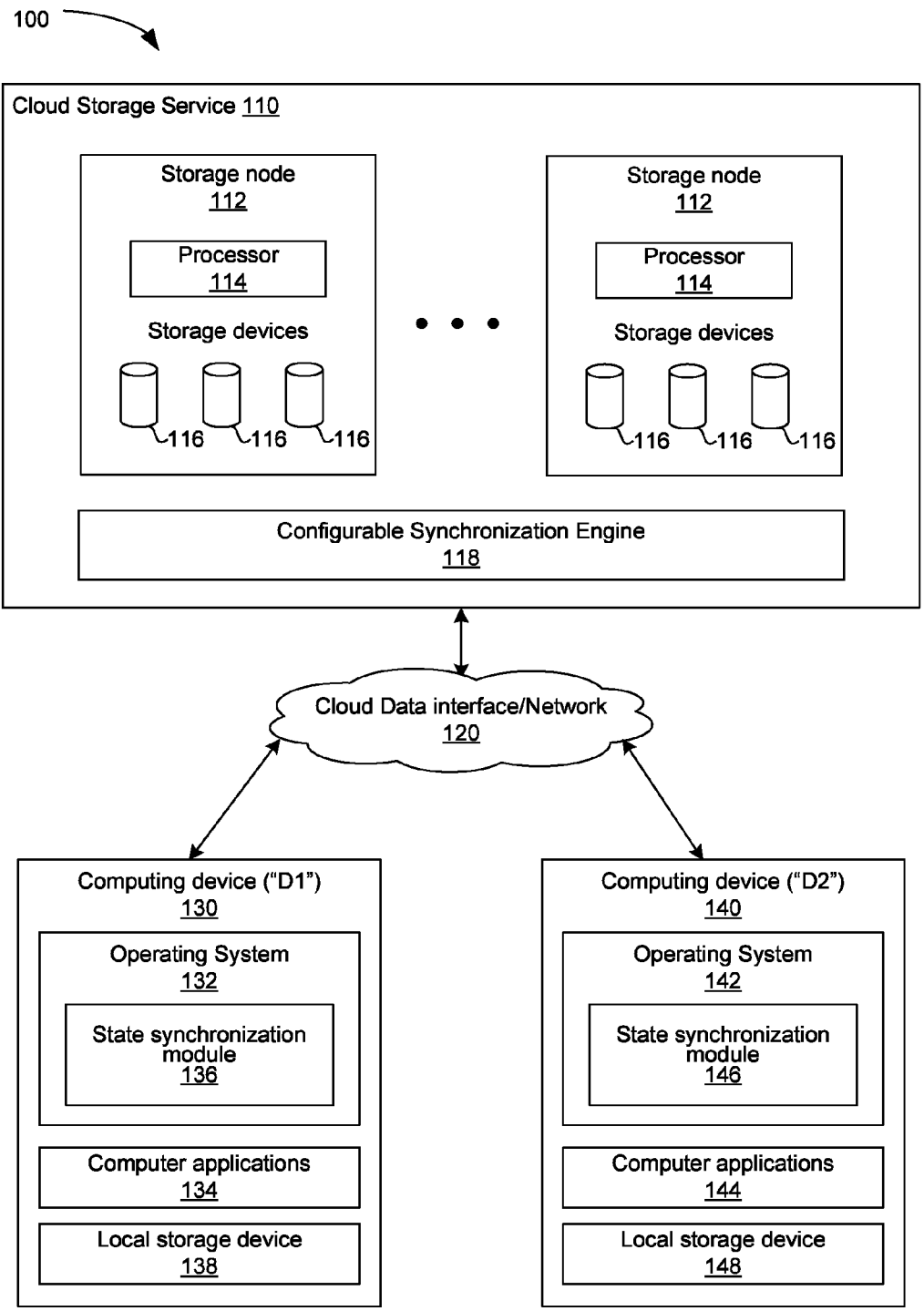
FIG. 1 is a block diagram illustrating an example cloud storage environment for facilitating configurable application state synchronization between computing devices.

FIG. 1 is a block diagram illustrating an example cloud storage environment 100 for facilitating configurable application state synchronization between computing devices. The cloud storage environment 100 includes a cloud storage service 110 configured to store application state data and other digital data for applications.

In one embodiment, the cloud storage service 110 can be a storage cluster having computer nodes interconnected with each other by a network. The storage cluster can communicate with other computing devices via the Internet. The cloud storage service 110 contains storage nodes 112. Also, one or more storage nodes 112 may be referred to as a storage server or cloud storage server. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud synchronization interface 120 can also be included to receive data to be stored in the cloud storage service. The cloud synchronization interface 120 can include network communication hardware and network connection logic to receive the information from computing devices. The network can be a local area network (LAN), wide area network (WAN) or the Internet. The cloud synchronization interface 120 may include a queuing mechanism to organize the received synchronization data to be stored in the cloud storage service 110. The cloud synchronization interface 120 can communicate with the cloud storage service 110 to send requests to the cloud storage service 110 for storing application state data and retrieving data.

Computing device 130 includes an operating system 132 to manage the hardware resources of the computing device 130 and provide services for running computer applications 134. The computer application 134 stored in the computing device 130 require the operating system 132 to properly run on the device 130. The computing device 130 can backup application states of the computer applications 134 to the cloud storage service 110. The computing device 130 includes at least one local storage device 138 to store the computer applications, application data, and user data. The computing device 130 can synchronize the application state data with the cloud storage service 110 via the cloud synchronization interface 120. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 includes a state synchronization module 136 to backup application state information from the local storage. The state synchronization module 136 can operate to keep the application state data from the computing device 130 in synchronization with the cloud storage service 110 and other devices.

Similarly, another computing device 140 can also synchronize the application state with the cloud storage service 110. The computing devices 130 and 140 can synchronize the application states between each other via the cloud storage service 110. For instance, the computing device 130 can synchronize the application state of a computer application to the cloud storage service 110. The cloud storage service 110 communicates with the computing device 140 to know that the computing device 140 also contain this computer application and the application state of this computer application is not updated on the computing device 140. In turn, the cloud storage service 110 sends the application state data to the computing device 140. Thus, the application state of this computer application is synchronized between the computing devices 130 and 140.

In one embodiment, the synchronization for backups from the computing devices 130 and 140 to the cloud storage service 110 may take place on a configurable periodic basis, such as an hour or a day. In other words, the synchronization is scheduled to take place on a periodic basis. The scheduled synchronization can also check for updates that can be sent from the cloud storage service 110 to the computing devices 130 and 140.

Another type of synchronization can be a triggered when an event occurs on the computing device 130 or 140, and then the state synchronization module can initialize the application state data synchronization with the cloud storage service 110. The triggered synchronization does not need the intervention from the user. For instance, a user turns off the screen of the computing device 130. The screen turning off event can trigger an application state data synchronization with the cloud storage service 110 as well as other computing devices. However, the user does not need to specifically instruct the device to synchronize; the user does not even need to realize that the synchronization occurs.

In one embodiment, the sync event can be any of the following events: the screen of the computing device being turned off, the instance of the computer application being closed, the instance of the computer application being paused, the instance of the computer application having been run continuously for a preconfigured period of time, the instance of the computer application being switched by another application, the instance of the computer application being switched from the foreground to a background of the operating system, a battery level of the computing device being below a preconfigured value, the computing device turning off, the computing device switching to standby mode, a clock of the computing device reaching a preconfigured time of day, and the computing device being in a preconfigured location In one embodiment, the synchronization can be a delta synchronization where the computing device 130 or 140 detects a change (i.e. delta) of application state data and only the changed data or difference are synchronized to the cloud storage device 110.

Any computing device running an operating system having the state synchronization module can initialize the application state synchronization. In addition, the cloud storage service 110 can also initialize the application state synchronization. In one embodiment, the cloud storage service 110 may analyze the computing devices to determine which device is to be synchronized and state data of which application are to be synchronized.

In some embodiments, elements of the cloud storage service 110, e.g., one or more cloud storage servers, interact with the computing devices in the cloud based service 110 to provide supplemental application synchronization information associated with particular applications to the computing devices. The computing devices may request the supplemental application synchronization information when, for example, a particular application is downloaded, when the particular application is installed, when the particular application is started up or initialized, etc. Alternatively or additionally, the cloud storage service may monitor and/or otherwise track the applications on the computing devices and provide the necessary supplemental application synchronization information when the application status changes, periodically, when the supplemental application synchronization information is updated, etc.

In any case, supplemental application synchronization information for particular applications is provided by a cloud-based server of the cloud-based storage service to one or more computing devices on which the application resides or is installed. The supplemental application synchronization information can include application-specific configuration information for synchronizing a state of a particular application with the cloud-based storage service.

In one embodiment, the application-specific configuration information for synchronizing the state of the first application with the cloud-based storage service can comprise one or more application constraints associated with the particular application. The one or more application constraints can be, for example, DRM constraints used to constrain the number of devices on which the digital content can be located. This information can be determined by the cloud-based storage service and communicated to the computing devices.

In one embodiment, application developers such as, e.g., game developers facilitate purchases of virtual goods or data also referred to as "in-app purchases." The "in-app purchases" can be consumable short-term virtual goods or long-term virtual goods. For example, a consumable virtual good could be a life in a game, e.g., candy crush life, that is gone once it is used. Conversely, a long-term virtual good is something that is there forever, e.g., buy a level in most games and it is there forever. In order to synchronize these "in-app purchases", e.g., the unused consumable and the long-term virtual goods, the application developers often take this data and encrypt it with a device identifier. The device identifier can be, and often is, a hardwired identifier that uniquely identifies a particular phone. While this information can be synchronized between multiple devices using the cloud based storage service, other computing devices cannot decrypt this information.

Accordingly, the technology described herein provides for a technique for spoofing device identifiers. The spoofing information and instructions can be provided to the computing devices in supplemental application synchronization information which can be provided for each individual application. As discussed herein, the supplemental application synchronization information detects when a computing device is using a particular application and responsively directs the computing device to use a device identifier other than its own (a spoofed device identifier) when initializing and/or otherwise using that particular application. An example is discussed in greater detail with reference to FIG. 2.

Figure 2:
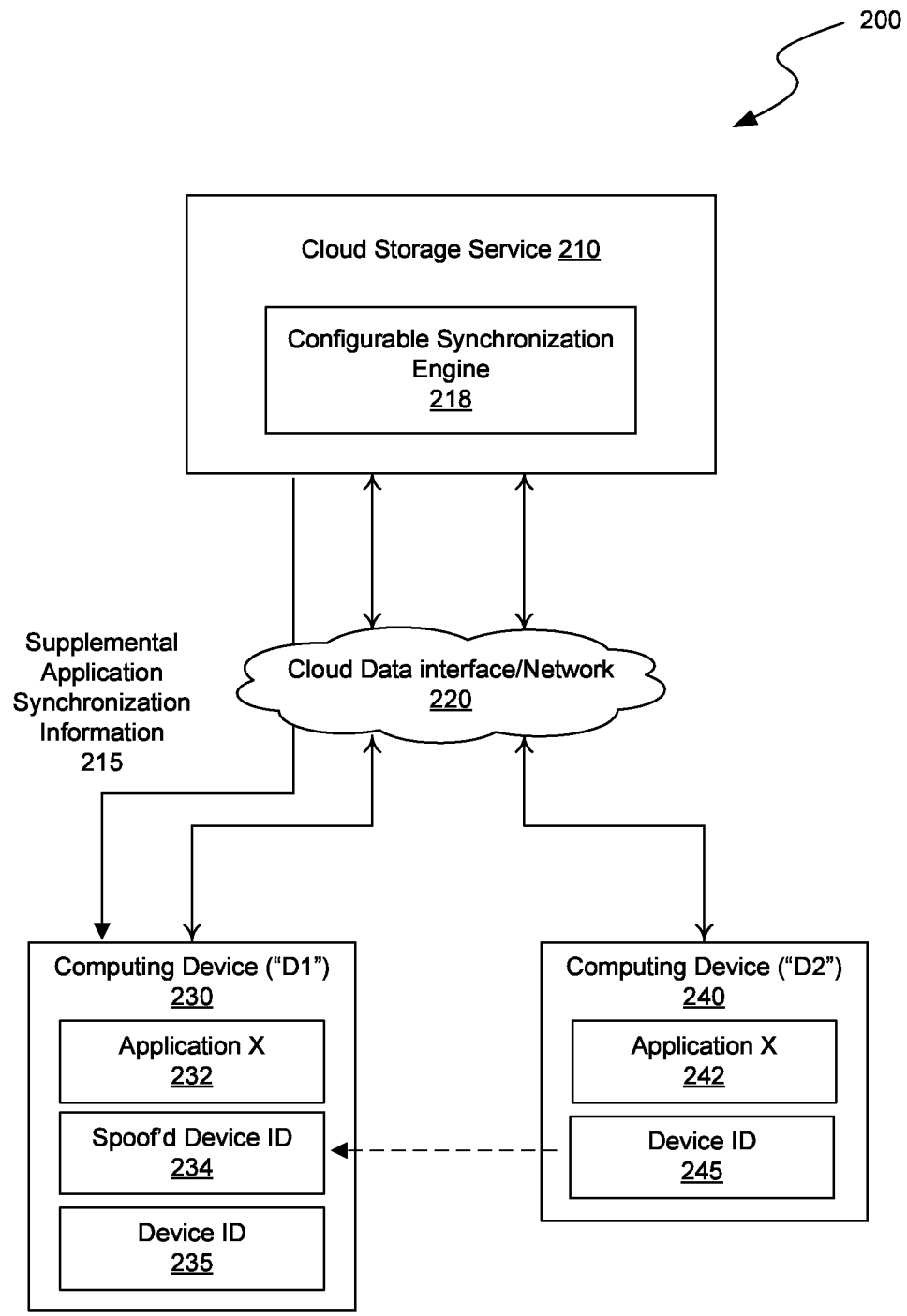
FIG. 2 is block diagram illustrating an example of configuring an application to 'spoof' a device identifier to synchronize an application state for application state synchronization.

FIG. 2 is block diagram 200 illustrating an example of configuring an application to 'spoof' a device identifier to synchronize an application state for application state synchronization, according to an embodiment. The cloud storage service 210 facilitates the spoofing via a configurable synchronization engine 218. The cloud storage service 210 and the configurable synchronization engine 218 can be the cloud storage service 110 and the configurable synchronization engine 118 of FIG. 1, respectively, although alternative configurations are possible.

In the example of FIG. 2, computing device 240 (D2) installs an instance of application X 242. Application X can be, for example, the Angry Birds application. Assume that a user of computing device D2 buys a new Angry Birds level. The information allowing the user to unlock the new level is sent to computing device D2 from the application developer's server (or a third party server) and is encrypted with the identifier of the device, in this case, device ID 245 and saved to the device's SD-card. Subsequently, a computing device 230 (D1) installs a second instance of the application X 232. On install, activation, or the like, the configurable synchronization engine is notified and/or otherwise becomes aware of this second instance of application X and responsively generates and provides computing device D1 with supplement application synchronization information. In this case, the supplemental application synchronization information detects when a computing device is using a particular application and responsively directs the computing device to use a device identifier other than its own (a spoofed device identifier 234) when initializing and/or otherwise using that particular application. The spoofed device identifier is the device identifier 245. In this manner synchronization of data that is encrypted with particular device identifiers can occur between devices.

Figure 3:
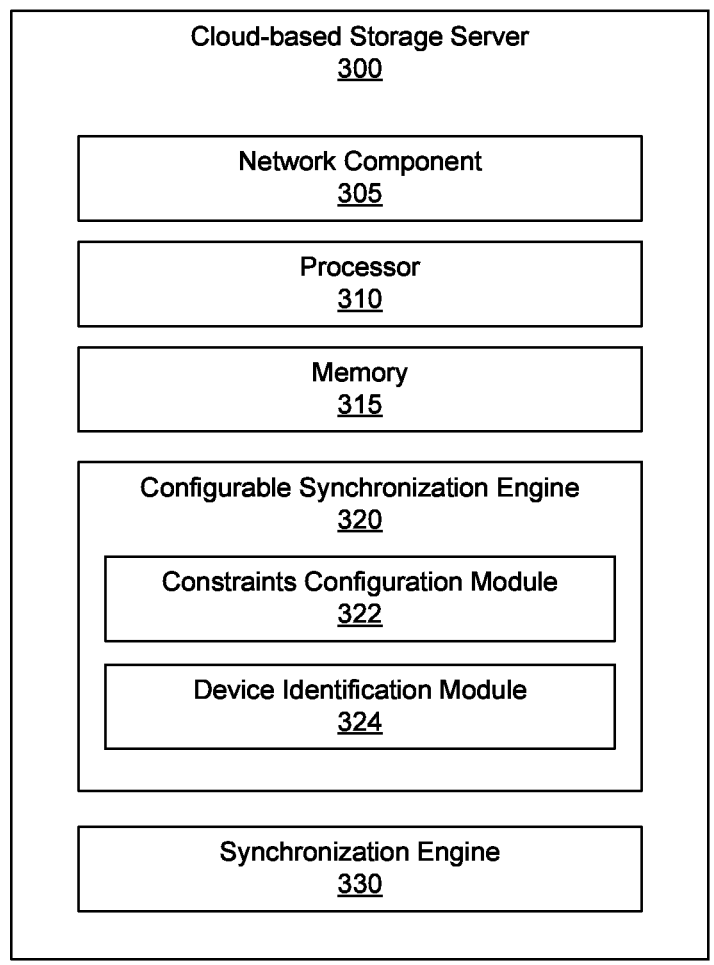
FIG. 3 is a block diagram illustrating example components of a cloud server in a cloud-based storage environment.

FIG. 3 is a block diagram illustrating example components of a cloud storage server 300 of a cloud storage service such as, for example, cloud storage service 110 of FIG. 1, according to an embodiment. Cloud storage server 300 can be, e.g., a dedicated standalone server, or implemented in a cloud computing or storage service having a plurality of servers. In this example, the cloud-based storage server 110 includes a network component 305, a processor 310, a memory 315, an application classification module 320, and a synchronization engine 330. Additional or fewer components are possible.

The memory 315 can include instructions which when executed by the processor 310 enables the cloud-based storage server 300 to perform the functions described herein including the configurability of automatic synchronization of application states across multiple devices using cloud storage. As discussed herein, the configurability of automatic synchronization of application states resolve or mitigate a number of synchronization issues such as, for example, potential device identifier encryption issues during synchronization by 'spoofing' a device ID and potential issues with DRM during synchronization. Additional benefits of the configurable synchronization mechanisms will become more apparent to those skilled in the art from a study of the following detailed description in conjunction with the appended claims and drawings, all of which form a part of this specification.

The network component 305 is configured for network communications with the computing devices, e.g., computing devices 130 and 140. The network communications can include, for example, receiving data files from the computing devices, sending data files to the computing devices upon access requests or synchronization events, and/or receiving requests for backup, access, or synchronization.

The configurable synchronization module 320 implements the configurable synchronization engine 118 of FIG. 1 for facilitating configurable synchronization mechanisms for automatic synchronization of application states across multiple devices using cloud storage. As shown in the example of FIG. 3, application classification module 320 includes a constraints configuration module 322 and a device identification module 324.

The constraints configuration module 322 determines whether a particular application is associated with one or more application constraints. The application constraints can be, for example, DRM constraints that are placed on particular content items and/or applications. For example, some content providers only allow content to be used an a specific (limited) number of the user's devices. The constraints configuration module 322 identifies these constraints and interacts and/or otherwise communicates the constraint information to user's. The users can then set particular configuration settings for the constraints and/or otherwise determine if they want to synchronize particular application content or particular data objects based on the constraint information.

In one embodiment, the constraints configuration module 322 may query a user of a device to notify the user about particular DRM constraints on content associated with a particular application. The constraints configuration module 322 can receive a response from the user and responsively modify application-specific configuration information to include instructions indicating one or more application constraints to the application. The instructions can direct the application to, for example, forego synchronization of particular data items. Example operation of the constraints configuration module 322 is discussed in more detail with reference to FIG. 8.

The device identification module 324 determines whether an application needs to 'spoof' a device identifier to synchronize an application state for application state synchronization as described in FIG. 2. Example operation of the device identification module 324 is also discussed in more detail with reference to FIG. 9.

The synchronization engine 330 performs the server-side aspects associated with the automatic synchronization of application states across the multiple computing devices using the configurable synchronization mechanisms described herein.

Figure 4:
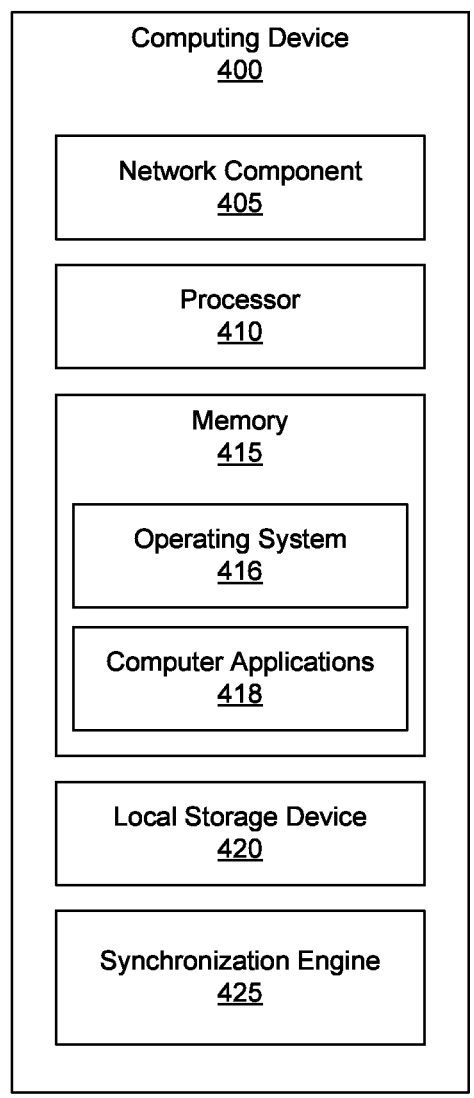
FIG. 4 is a block diagram illustrating example components of a computing device in a cloud-based storage environment.

FIG. 4 is a block diagram illustrating example components of a computing device 400 in a cloud storage environment having a distributed file system such as, for example, cloud-based storage environment 100 of FIG. 1, according to an embodiment. The computing device 400 can be one of computing devices 130 and 140 of FIG. 1, although alternative configurations are possible. The computing device 400 can include a network component 405, a processor 410, a memory 415, a local storage device 420, and a creation/access tracking engine 425. The memory 415 can store instructions of the operating system 416 for computing device 400. The memory 415 can further store instructions of the computer applications 418 designed to run or execute at (or on) the computing device 400.

The network component 405 can be capable of switching between states including a high power consumption state and a low power conservation state. The network component 405 can be, e.g. a Wi-Fi networking adapter, a cellular phone networking adapter, or a combination thereof. The processor 410 is configured to execute the computer applications 416 and the operating system 132 of the computing device 400. The memory 415 stores instructions of the operating system 416 which, when executed by the processor 410, cause the operating system 416 to perform processes for realizing certain functionalities of the computing device 400. For instance, the process of the operating system 416 can facilitate access of data objects from the distributed file system, tracking of the applications accessing these data objects, and various transfers of data from or to other computing devices 130 and 140 and/or cloud-based storage server 300.

The local storage device 420, as described above, can store the instructions, the operating system 416, user data such as profile data of the user, data files of the user and any other data necessary for the operation of the computing device 400 and execution of the computer applications 418.

The computing device 400 also includes the synchronization engine 425. The synchronization engine 425 performs the client-side aspects associated with the automatic synchronization of application states across the multiple computing devices using the configurable synchronization mechanisms described herein.

Figure 5:
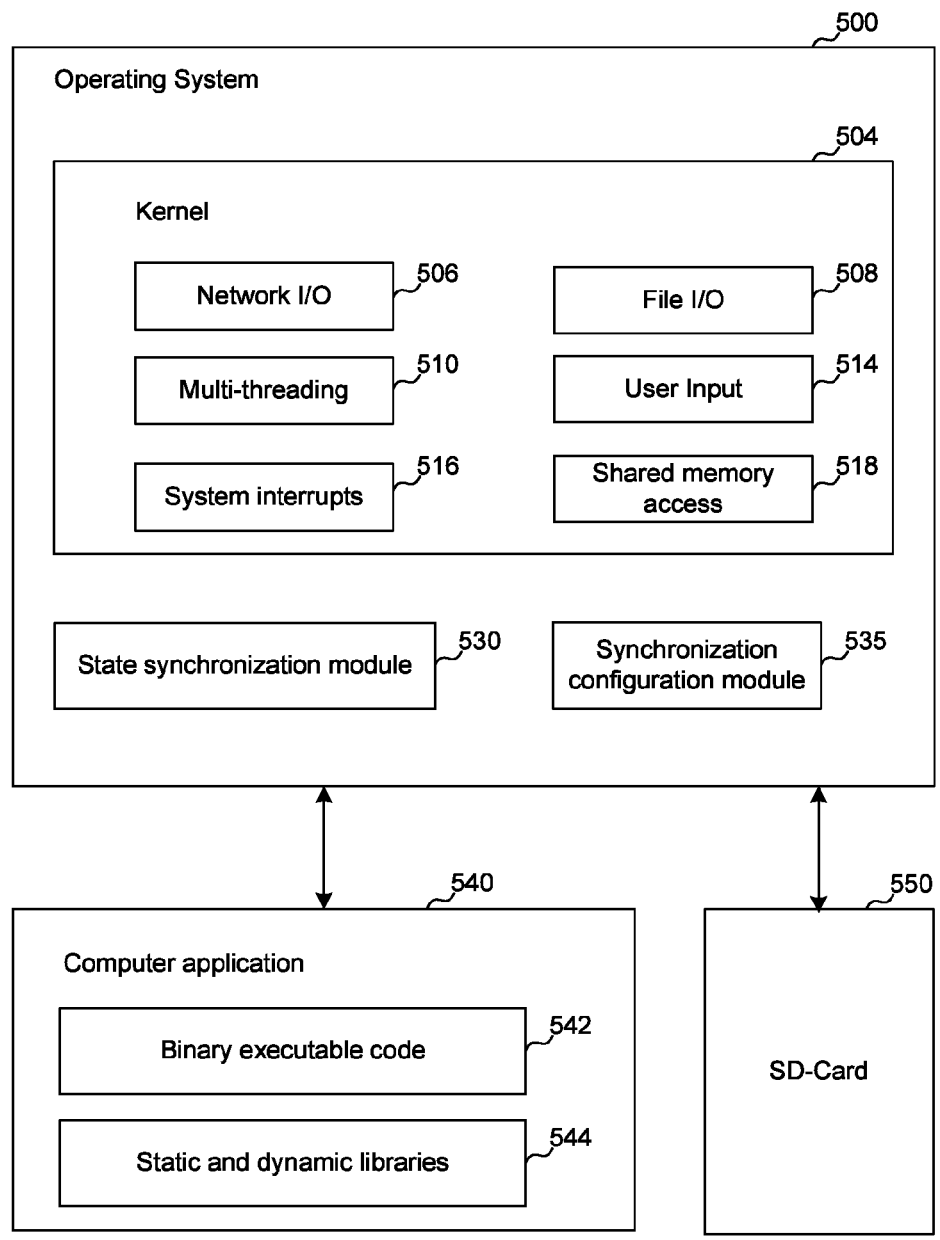
FIG. 5 illustrates an example operating system of a computing device.

FIG. 5 illustrates an example operating system of a computing device, according to an embodiment. The operating system 500 includes a kernel 504. The kernel 504 provides interfaces to hardware of the electronic device for the computer applications running on top of the kernel 504, and supervises and controls the computer applications. The kernel 504 isolates the computer applications from the hardware. The kernel 504 may include one or more intervening sources that can affect execution of a computer application. In one embodiment, the kernel 504 includes a network I/O module 506, a file I/O module 508, multi-threading module 510, user input 514, system interrupts 516, and shared memory access 518.

A state synchronization module 530 and synchronization configuration module 535 run on top of the kernel 504. The state synchronization module 530 and synchronization configuration module 535 monitors the information from the intervening sources of the kernel 504 and records state data according the information. In the example of FIG. 5, a computer application 540 includes a binary executable code 542 that can run on top of the operating system 500. The computer application 540 can further include static and dynamic libraries 544 that are referenced by the binary executable code 542 during application running. In one embodiment, the state synchronization module 530 runs in a user space file system (e.g. FUSE) on top of a Linux kernel. In another embodiment, the state synchronization module 530 runs in a kernel file system.

Figure 6:
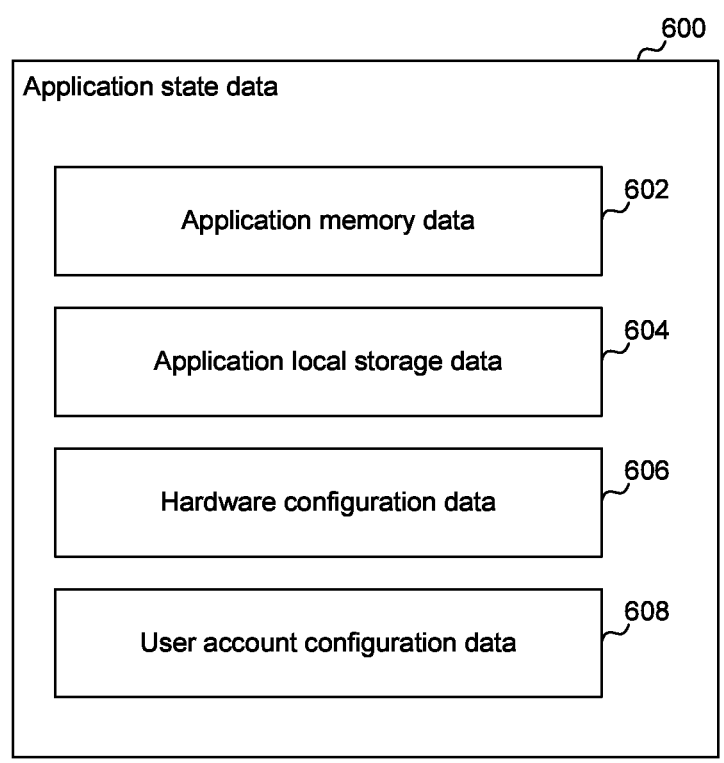
FIG. 6 illustrates an example of an application state data of a computer application collected by an operating system.

FIG. 6 illustrates an example of an application state data of a computer application collected by an operating system, according to one embodiment. The application state data 600 of a computer application may include application memory data 602, application local storage data 604, hardware configuration data 606, and user account configuration data 608. In some other embodiments, the application state data can be all of or any combination of some of the fields 602, 604, 606 and 608. When the computer application is running, the state information in memory section (i.e. the application memory data 602) allocated for the application is being updated by the running application. The state synchronization module of the operating system monitors the application memory data 602, and uploads the data to a cloud storage service in response to the sync event. Furthermore, the computer application can update certain data on a local storage of the electronic device. The state synchronization module of the operating system can include the application local storage data 604 into the application state data 600. In some embodiments, the electronic device includes a memory device, e.g. flash memory, as both the memory and the local storage. Therefore, the application memory data 602 and application local storage data 604 can be one section of data that exists on the memory device of the electronic device.

The application state data 600 may further include hardware configuration data 606. For instance, the state synchronization module may record the current device sound volume level and the screen brightness level when the application is running. These device sound volume level and the screen brightness level are recorded as part of the hardware configuration data 605 and will be uploaded to the cloud storage service. Therefore, after another device is synchronized with the application state data and starts to resume running the application, the other device automatically adjusts the sound volume level and screen brightness level as on the previous device. Moreover, the application state data 600 may include user account configuration data 608. The user account configuration data 608 may include the user's preferences and choices regarding the computer application and the operating system environment for running the computer application. For instance, the user account configuration data 608 may include information about the user's language preference. Assuming the computer application is a game supporting both English and Chinese languages for user interface in the game, the user has selected the English language as the preferred language. The state synchronization module records the user's language preference as a part of the user account configuration data 608. The user account configuration data 608 is synchronized to another device via the cloud storage service. When the other device starts to resume running the application, the application will use the English language for the game interface, as indicated by the user account configuration data 608.

Figure 7:
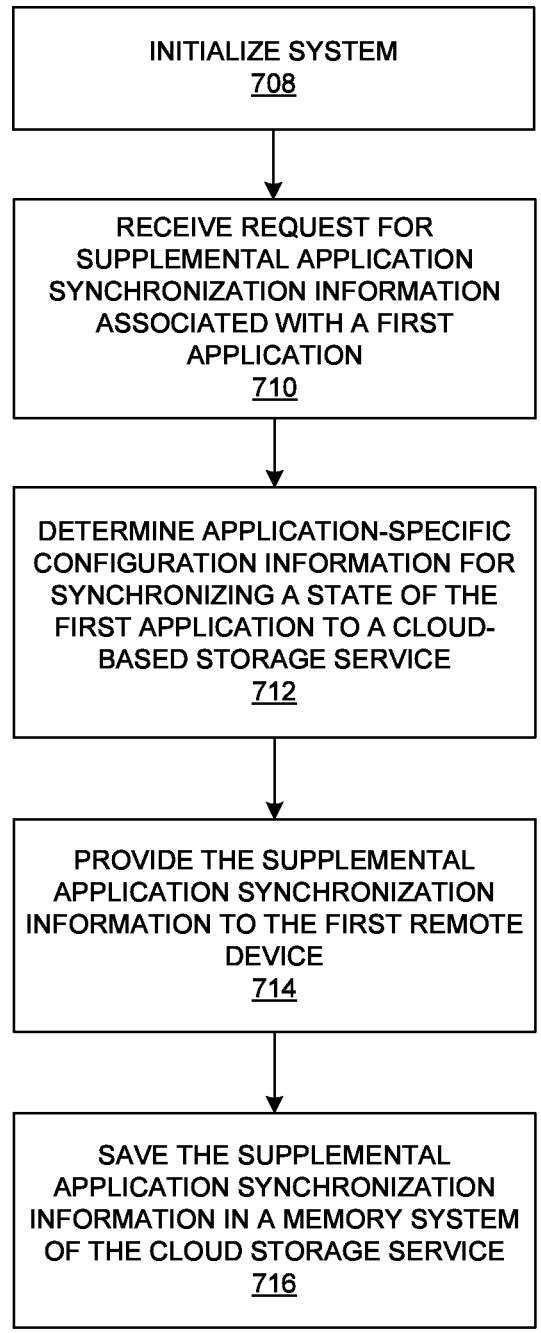
FIG. 7 is a flow diagram illustrating an example process for facilitating configurable application state synchronization between computing devices.

FIG. 7 is a flow diagram illustrating an example process 700 for facilitating configurable application state synchronization between computing devices. One or more cloud storage servers of a cloud storage service e.g., cloud storage service 110 of FIG. 1, among other functions, perform the example process 700.

To begin, at step 708, the cloud storage server initializes the system. The initialization can include loading synchronization memory, identifying particular devices associated with users in cloud storage service, etc. At step 710, the cloud storage server receives a request for supplemental application synchronization information associated with a first application. The request can be received from another internal component of the cloud storage server or, for example, as a communication from a computing device.

In one embodiment, the cloud storage server further detects a synchronization failure of the first application on the first remote device or receives a message from the first device indicating that the first application has failed. In the latter case, the first remote computing device is configured to detect the synchronization failure. In some embodiments, the request for the supplemental application synchronization information is received responsive to the synchronization failure of the first application. In one embodiment, the request for the supplemental application synchronization information is received responsive to an indication that the first application has been downloaded on the first remote computing device. In one embodiment, the request for the supplemental application synchronization information is received responsive to an indication that the first application has been installed on the first remote computing device.

At step 712, the cloud storage server determines application-specific configuration information for synchronizing a state of the first application to a cloud-based storage service. As discussed herein, the application-specific configuration information can facilitate spoofing of device identifiers facilitating the automatic synchronization of application states across multiple devices using cloud storage service. An example of spoofing is discussed in greater detail with reference to FIG. 9. Additionally, the application-specific configuration information can be used to provide instructions that notify applications about specific constraints and direct the appropriate application behavior (e.g., synchronize or limited number of devices and therefore do not synchronize). An example discussing application constraints is discussed in greater detail with reference to FIG. 8.

At step 714, the cloud storage server provides the supplemental application synchronization information to the first remote device. Lastly, at step 716, the cloud storage server saves or stores the supplemental application synchronization information in a memory system of the cloud storage service.

Figure 8:
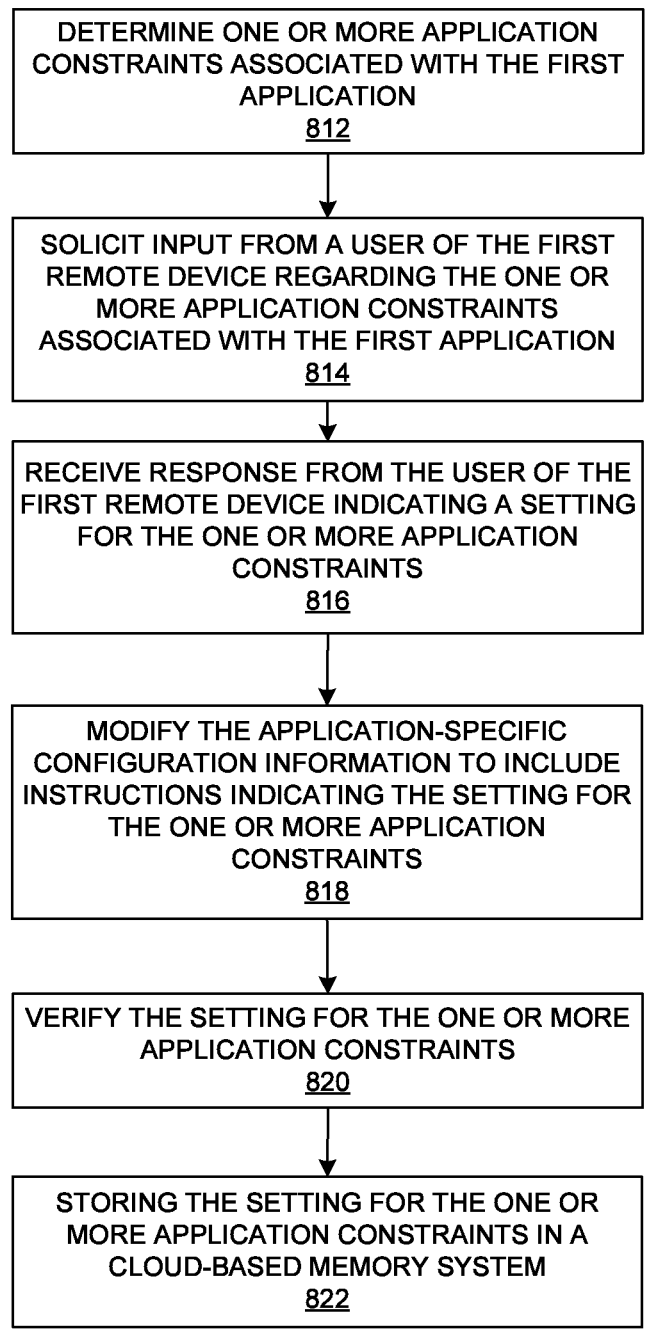
FIG. 8 is a flow diagram illustrating an example process for determining the application-specific configuration information for synchronizing a state of a particular application on a particular computing device with the cloud storage service.

FIG. 8 is a flow diagram illustrating an example process 800 for determining the application-specific configuration information for synchronizing a state of a particular application on a particular computing device to the cloud storage service, according to an embodiment. One or more cloud-based storage servers of a cloud storage service e.g., cloud storage service 110 of FIG. 1, among other functions, perform the example process 800.

To begin, at step 812 the cloud storage server determines one or more application constraints associated with the first application. The one or more application constraints can be, for example, DRM constraints used to constrain the number of devices on which the digital content can be located. The constraints can also include, among other constraints, a constraint indicating a maximum number of devices available by the user (e.g., associated with the user) for synchronization in the cloud storage service.

At step 814, the cloud storage server solicits input from a user of the first remote device regarding the one or more application constraints associated with the first application. At step 816, the cloud storage server receives a response from the user of the first remote device indicating a setting for the one or more application constraints and/or a response (e.g., synchronize application data or do not synchronize application data).

At step 818, the cloud storage server modifies the application-specific configuration information to include instructions indicating the setting for the one or more application constraints. At step 820, the cloud storage server verifies the setting for the one or more application constraints. Lastly, at step 822, the cloud storage server stores the setting for the one or more application constraints in a cloud-based memory system.

Figure 9:
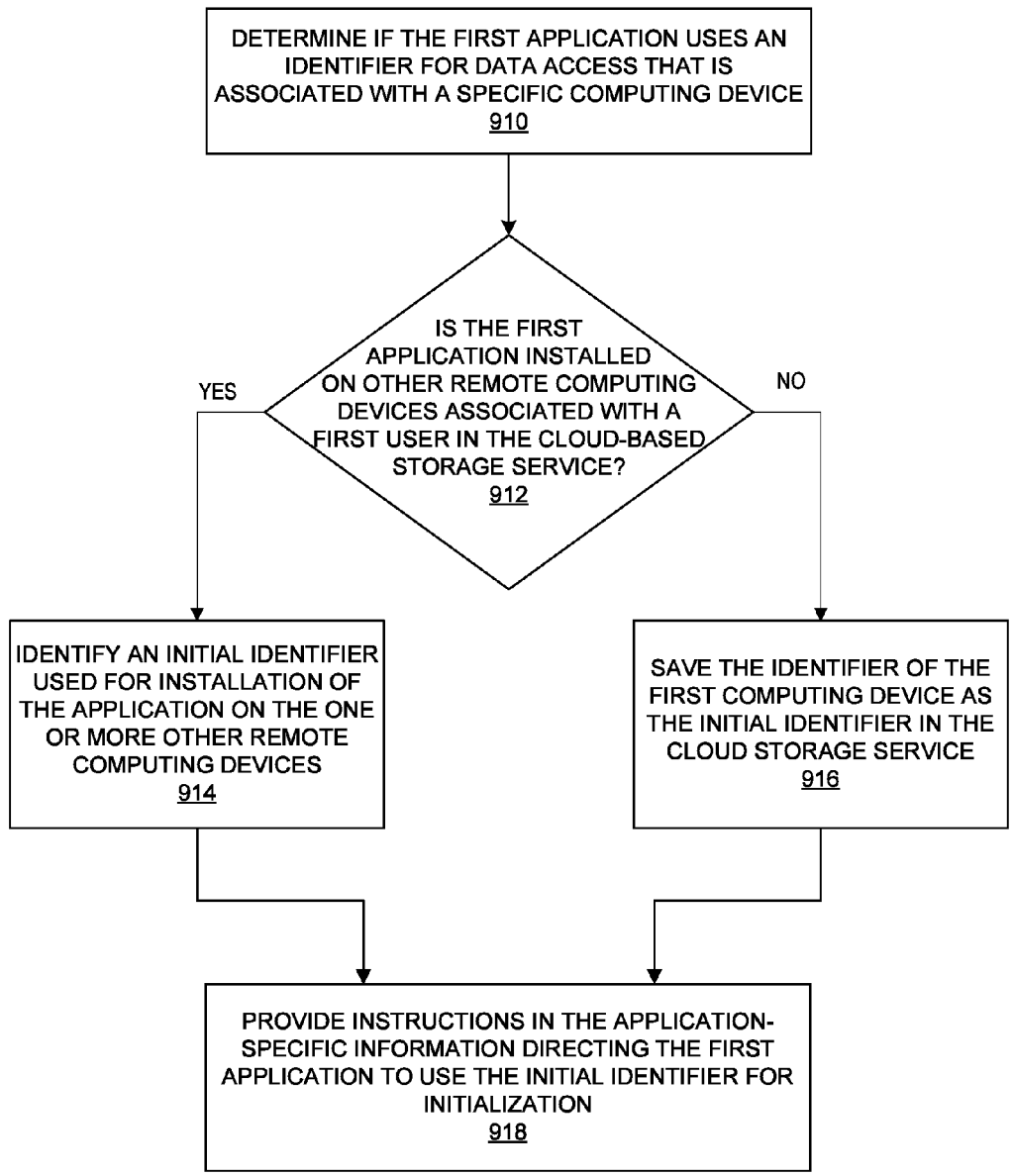
FIG. 9 is a flow diagram illustrating another example process for determining the application-specific configuration information for synchronizing a state of a particular application on a particular computing device to the cloud storage service.

FIG. 9 is a flow diagram illustrating an example process 900 for determining the application-specific configuration information for synchronizing a state of a particular application on a particular computing device to the cloud storage service, according to an embodiment. One or more cloud-based storage servers of a cloud storage service e.g., cloud storage service 110 of FIG. 1, among other functions, perform the example process 900.

To begin, at step 910, the cloud storage server determines if the first application uses an identifier for data access that is associated with a specific computing device. If so, the cloud storage server understands that the identifier needs to be spoofed. In one embodiment, the identifier for data access is hardwired to the specific computing device. In one embodiment, the identifier for data access used for encrypting a data encryption key for the data access. In one embodiment, the identifier comprises a device identifier, an Android identifier, or a serial identifier.

At decision step 912, the cloud storage server determines if the first application is installed on other remote computing devices associated with a first user in the cloud-based storage service. The cloud storage server can make this determination by, for example, maintaining configuration files for the computing devices or the like. Alternatively or additionally, the cloud storage server can identify computing devices associated with the user and query those devices for their configuration information. If the first application is installed on other remote computing devices associated with a first user in the cloud-based storage service, at step 912, the cloud storage server identifies an initial identifier used for installation of the application on the one or more other remote computing devices. Again, the cloud storage server can maintain this information in configuration files associated with the devices and/or the user. Alternatively or additionally, the cloud storage server can query the computing devices to obtain this information. If the first application is not installed on other remote computing devices associated with a first user in the cloud-based storage service, at step 916, the cloud storage server saves or stores the identifier of the first computing device as the initial identifier in the cloud storage service. This initial identifier will then be 'spoofed' by any subsequent instantiations of the application on other computing devices associated with the user.

Lastly, at step 918, the cloud storage server provides instructions in the application-specific information directing the first application to use the initial identifier for initialization.

Figure 10:
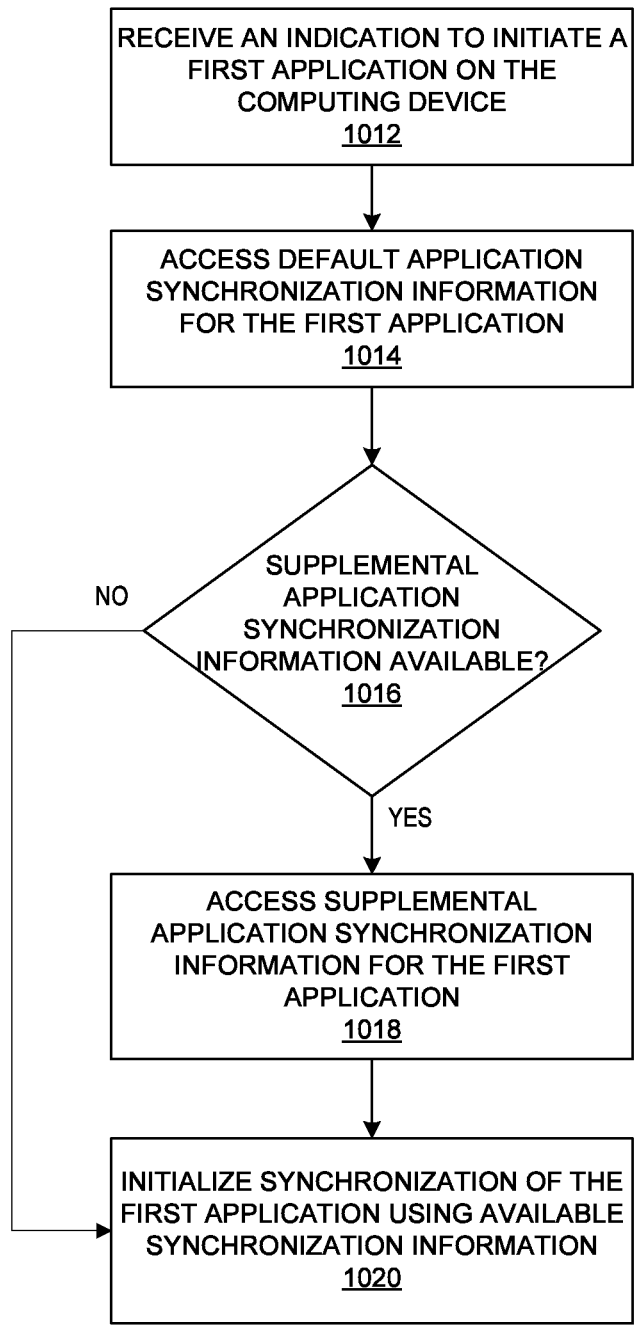
FIG. 10 is a flow diagram illustrating an example process for facilitating configurable application state synchronization between computing devices.

FIG. 10 is a flow diagram illustrating an example process 1000 for facilitating configurable application state synchronization between computing devices, according to an embodiment. One or more cloud storage servers of a cloud storage service e.g., cloud storage service 110 of FIG. 1, among other functions, perform the example process 1000.

To begin, at step 1012, the computing device receives an indication to initiate a first application on the computing device. At step 1014, the computing device accesses default application synchronization information for the first application. At decision step 1016, the computing device determines if supplemental application synchronization information available. If supplemental application synchronization information available, at step 1018, the computing device accesses the supplemental application synchronization information for or associated with the first application.

Lastly, at step 1020, the computing device initializes the synchronization of the first application using the available synchronization information.

Figure 11:
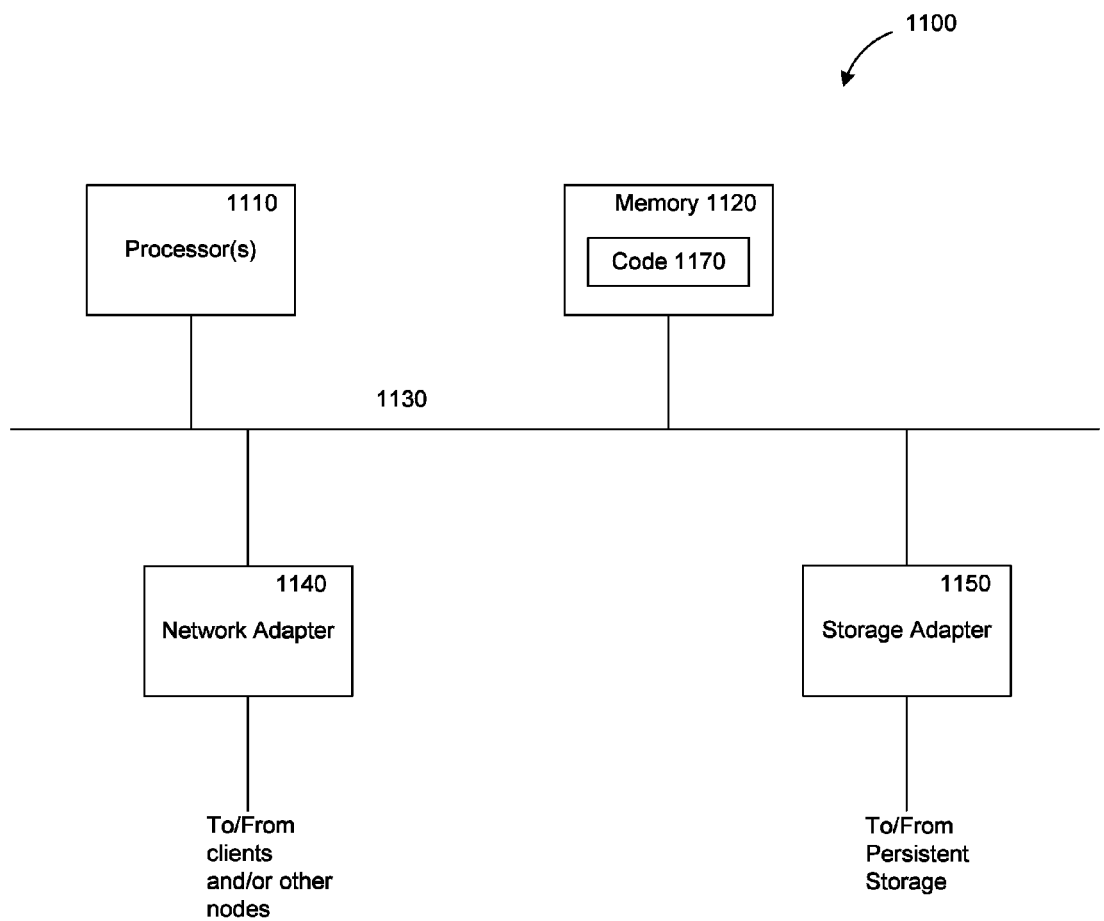
FIG. 11 is a block diagram of a computer system as may be used to implement features of some embodiments of the disclosed technology.

FIG. 11 is a block diagram of a computer system as may be used to implement features of some embodiments of the disclosed technology. The computing system 1100 may be used to implement any of the entities, components or services depicted in the examples of FIGS. 1-10 (and any other components described in this specification). The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1110 and storage devices 1120 are computer-readable storage media that may store instructions that implement at least portions of the described technology. In addition, the data structures and message structures may be stored or transmitted via a data transmission medium, such as a signal on a communications link. Various communications links and/or networks may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the computing system 1100 by downloading it from a remote system through the computing system 1100 (e.g., via network adapter 1130).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method comprising:
receiving a request for supplemental application synchronization information associated with a first application on a first remote computing device;
determining that the first application uses an identifier associated with a certain computing device to enable a synchronized state;
in response to the request for the supplemental application synchronization information, determining application-specific configuration information for synchronizing a state of the first application with a cloud-based storage service; and
providing, by a cloud-based server of the cloud-based storage service, the supplemental application synchronization information to the first remote computing device, wherein the supplemental application synchronization information includes the application-specific configuration information including an identifier associated with a second remote computing device to use for synchronizing the state of the first application on the first remote computing device with the cloud-based storage service;
wherein determining the application-specific configuration information for synchronizing the state of the first application with the cloud-based storage service further comprises:
identifying the second remote computing device as the certain computing device for providing the identifier used by the first application to enable the synchronized state; and
including, in the application-specific configuration information, the identifier associated with the second remote computing device for spoofing the identifier used by the first application when synchronizing the state of the first application with the cloud-based storage service, wherein the identifier is a device identifier of the second remote computing device.

2. The computer-implemented method of claim 1, further comprising detecting, by the cloud-based server, a synchronization failure of the first application on the first remote computing device.

3. The computer-implement method of claim 2, wherein the request for the supplemental application synchronization information is received responsive to the synchronization failure of the first application.

4. The computer-implement method of claim 1, wherein the request for the supplemental application synchronization information is received responsive to an indication that the first application has been downloaded on the first remote computing device.

5. The computer-implement method of claim 1, wherein the request for the supplemental application synchronization information is received responsive to an indication that the first application has been installed on the first remote computing device.

6. The computer-implemented method of claim 1, wherein determining the application-specific configuration information for synchronizing the state of the first application with the cloud-based storage service further comprises determining one or more application constraints associated with the first application.

7. The computer-implemented method of claim 6, wherein determining the application-specific configuration information for synchronizing the state of the first application with the cloud-based storage service further comprises:
further comprises:
soliciting input from a user of the first remote computing device regarding the one or more application constraints associated with the first application;
receiving response from the user of the first remote computing device indicating a setting for the one or more application constraints; and
modifying the application-specific configuration information to including instructions indicating the setting for the one or more application constraints.

8. The computer-implemented method of claim 7, wherein determining the application-specific configuration information for synchronizing the state of the first application with the cloud-based storage service further comprises:
verifying, by the cloud-based server, the setting for the one or more application constraints; and storing the setting for the one or more application constraints in a cloud-based memory system.

9. The computer-implemented method of claim 6, wherein the one or more application constraints comprise one or more data rights management (DRM) constraints.

10. The computer-implemented method of claim 6, wherein the one or more application constraints include a constraint indicating a maximum number of devices available for synchronization.

11. The computer-implemented method of claim 1, wherein determining the application-specific information for configuring the first application further comprises:
  determining that the first application uses an identifier for data access that is associated with a specific computing device;
  determining that the first application is already installed on the second remote computing device;
  identifying the identifier associated with the second remote computing device as the identifier used for data access by the first application on the second remote computing device; and
  providing instructions in the application-specific information directing the first application on the first remote computing device to use the identifier associated with the second remote computing device as the identifier for data access.

12. The computer-implemented method of claim 11, wherein the identifier for data access is hardwired to the second remote computing device.

13. The computer-implemented method of claim 11, wherein the identifier for data access is used for encrypting a data encryption key used for the data access by the first application.

14. A computer-implemented method comprising:
  receiving, at a computing device of a cloud-based storage service, an indication to initiate a first application on the computing device;
  determining that supplemental application synchronization information is available for the first application, wherein the supplemental application synchronization information includes application-specific configuration information for synchronizing a state of the first application with the cloud-based storage service;
  initializing, by the computing device, synchronization of the first application based on the supplemental application synchronization information being available;
  determining that the first application uses an identifier associated with a certain computing device to enable a synchronized state; and
  receiving, from a remote computing device having the first application installed, an identifier associated with the remote computing device to use for synchronizing the state of the first application on the computing device;
  wherein the application-specific configuration information for synchronizing the state of the first application with the cloud-based storage service includes an indication of the second remote computing device as the certain computing device for providing the identifier used by the first application to enable the synchronized state, and wherein, in the application-specific configuration information, the identifier associated with the second remote computing device is indicated to be the identifier used by the first application when synchronizing the state of the first application with the cloud-based storage service, wherein the identifier is a device identifier of the second remote computing device.

15. A cloud-based server system comprising:
  a processor;
  a memory system having instructions stored thereon, wherein the instructions, when executed by the processor, cause the cloud-based server system to:
    in response to a request for supplemental application synchronization information associated with a first application on a first remote computing device, determining application-specific configuration information for synchronizing a state of the first application with a cloud-based storage service;
    determine that the first application uses an identifier associated with a certain computing device to enable a synchronized state; and
    provide the supplemental application synchronization information to the first remote computing device, wherein the supplemental application synchronization information includes the application-specific configuration information including an identifier associated with a second remote computing device to use for synchronizing the state of the first application on the first remote computing device with the cloud-based storage service;
    wherein determining the application-specific configuration information for synchronizing the state of the first application with the cloud-based storage service further comprises:
      identifying the second remote computing device as the certain computing device for providing the identifier used by the first application to enable the synchronized state; and
      including, in the application-specific configuration information, the identifier associated with the second remote computing device as the identifier used by the first application when synchronizing the state of the first application with the cloud-based storage service, wherein the identifier is a device identifier of the second remote computing device.

16. The cloud-based server system of claim 15, wherein the instructions, when executed by the processor, further cause the cloud-based system to:
  detect a synchronization failure of the first application on the first remote computing device, wherein the request for the supplemental application synchronization information is received responsive to the synchronization failure of the first application.

17. The cloud-based server system of claim 15, wherein the request for the supplemental application synchronization information is received responsive to an indication that the first application has been downloaded on the first remote computing device or responsive to an indication that the first application has been installed on the first remote computing device.

18. The cloud-based server system of claim 15, wherein to determine the application-specific configuration information for synchronizing the state of the first application with the cloud-based storage service, the instructions, when executed by the processor, further cause the cloud-based system to:
  determine one or more application constraints associated with the first application;
  solicit input from a user of the first remote computing device regarding the one or more application constraints associated with the first application;
  responsive to receiving a response from the user of the first remote computing device indicating a setting for the one or more application constraints, modify the application-specific configuration information to including instructions indicating the setting for the one or more application constraints.

19. The cloud-based server system of claim 18, wherein the one or more application constraints comprise one or more data rights management (DRM) constraints.

20. The cloud-based server system of claim 15, wherein to determine the application-specific configuration information for synchronizing the state of the first application with the cloud-based storage service, the instructions, when executed by the processor, further cause the cloud-based system to:
  determine that the first application uses an identifier for data access that is associated with a specific computing device;
  determine that the first application is already installed on the second remote computing devices;
  identify the identifier associated with the second remote computing device as the identifier used for data access by the first application on the second remote computing device; and
  provide instructions in the application-specific information directing the first application on the first remote computing device to use the identifier associated with the second remote computing device as the identifier for data access.

21. A non-transitory computer-readable medium storing instructions to be implemented by a computer system having a processor, wherein the instructions, when executed by the processor, cause the computer system to:
  in response to a request for supplemental application synchronization information associated with a first application on a first remote computing device, determine application-specific configuration information for synchronizing a state of the first application with a cloud-based storage service;
  determine that the first application uses an identifier associated with a certain computing device to enable a synchronized state; and
  provide the supplemental application synchronization information to the first remote computing device, wherein the supplemental application synchronization information includes the application-specific configuration information including an identifier associated with a second remote computing device to use for synchronizing the state of the first application on the first remote computing device with the cloud-based storage service;
  wherein determining the application-specific configuration information for synchronizing the state of the first application with the cloud-based storage service further comprises:
    identifying the second remote computing device as the certain computing device for providing the identifier used by the first application to enable the synchronized state; and
  including, in the application-specific configuration information, the identifier associated with the second remote computing device as the identifier used by the first application when synchronizing the state of the first application with the cloud-based storage service, wherein the identifier is a device identifier of the second remote computing device.

22. The non-transitory computer-readable medium of claim 21, wherein the instructions, when executed by the processor, further cause the computer system to:
  determine that the first application uses an identifier for data access that is hardwired to a specific computing device;
  determine that the first application is already installed on one or more other remote computing devices associated with a first user in the cloud-based storage service;
  identify the identifier associated with the second remote computing device as the identifier used for data access by the first application on the second remote computing device; and
  provide instructions in the application-specific information directing the first application on the first remote computing device to use the identifier associated with the second remote computing device as the identifier for data access.

* * * * *